United States Patent
Okazaki et al.

(10) Patent No.: US 8,233,622 B2
(45) Date of Patent: Jul. 31, 2012

(54) TRANSMITTING PARALLEL DATA VIA HIGH-SPEED SERIAL INTERCONNECTION

(75) Inventors: Atsuya Okazaki, Kanagawa (JP); Yasunao Katayama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 12/141,763

(22) Filed: Jun. 18, 2008

(65) Prior Publication Data

US 2009/0319706 A1 Dec. 24, 2009

(51) Int. Cl.
*H04L 9/00* (2006.01)
(52) U.S. Cl. .......................... 380/47; 380/46
(58) Field of Classification Search .............. 710/106; 380/44–47
See application file for complete search history.

(56) References Cited

U.S. PATENT DOCUMENTS

| | | | | |
|---|---|---|---|---|
| 4,771,463 A * | 9/1988 | Beeman | ......................... | 380/46 |
| 4,791,669 A * | 12/1988 | Kage | ............................... | 380/46 |
| 5,345,508 A * | 9/1994 | Lynn et al. | ..................... | 380/46 |
| 5,541,995 A * | 7/1996 | Normile et al. | ................. | 380/42 |
| 7,003,111 B2 * | 2/2006 | Jaquette | .......................... | 380/46 |
| 7,010,687 B2 * | 3/2006 | Ichimura | ....................... | 713/167 |
| 7,248,833 B2 * | 7/2007 | Lee | ............................... | 455/41.2 |
| 7,509,500 B2 * | 3/2009 | Sarkar | .......................... | 713/189 |
| 7,680,273 B2 * | 3/2010 | Whitehead et al. | ............. | 380/46 |
| 8,107,628 B2 * | 1/2012 | Ikushima et al. | ............. | 380/268 |
| 2009/0024852 A1 * | 1/2009 | Yonezawa et al. | ............ | 713/180 |

* cited by examiner

*Primary Examiner* — Paul R Myers
(74) *Attorney, Agent, or Firm* — Yudell Isidore Ng Russell PLLC

(57) ABSTRACT

Synchronized pseudo-random number outputs are produced at a transmitter and a receiver of a high-speed serial interconnection. At the transmitter, using logic XOR operations, each data word of parallel data is selectively scrambled with one of the pseudo-random numbers and transmitted via a high-speed serial interface. The receiver de-scrambles the received serial data stream and restores the parallel data.

17 Claims, 2 Drawing Sheets

TRANSMITTING PARALLEL DATA VIA HIGH-SPEED SERIAL INTERCONNECTION

BACKGROUND OF THE INVENTION

1. Technical Field

The present invention generally relates to high-speed serial communications and, in particular, to techniques for transmitting parallel data via a high-speed serial interconnection.

2. Description of the Related Art

In high-speed serial communications, 8b/10b and 64b/66b coding schemes are presently used to achieve DC balancing and bounded disparity in transmitted data streams and provide, at a receiver terminal, enough state changes for clock recovery.

Using the 8b/10b and 64b/66b coding schemes, 8 bits and 64 bits of data are transmitted as 10-bit and 66-bit symbols, respectively. However, bit-count overhead of these coding schemes is a limiting factor in the transition to ever higher data transmission rates.

SUMMARY OF ILLUSTRATIVE EMBODIMENTS

A method, system, and computer program product for transmitting parallel data via a high-speed serial interconnection are disclosed.

In one embodiment, synchronized pseudo-random first and second numbers are produced at a transmitter and a receiver of the interconnection. The numbers have a bit length equal to a bit length of data words in the parallel data and are generated using different initial vectors. During data transmission, if the first output or a 1's complement thereof is equal to a data word, the transmitter serializes and transmits a logic XOR of the data word and the second number; otherwise, the transmitter serializes and transmits a logic XOR of the data word and the first number. During data reception, received data is de-serialized and then, if a logic XOR of (i) the first number and (ii) a logic XOR of a de-serialized data word and the second number are equal to the first number or a 1's complement thereof, the receiver outputs a logic XOR of the de-serialized data word and the second number; otherwise, the receiver outputs a logic XOR of the de-serialized data word and the first number.

All objects, features and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

Figure 1:
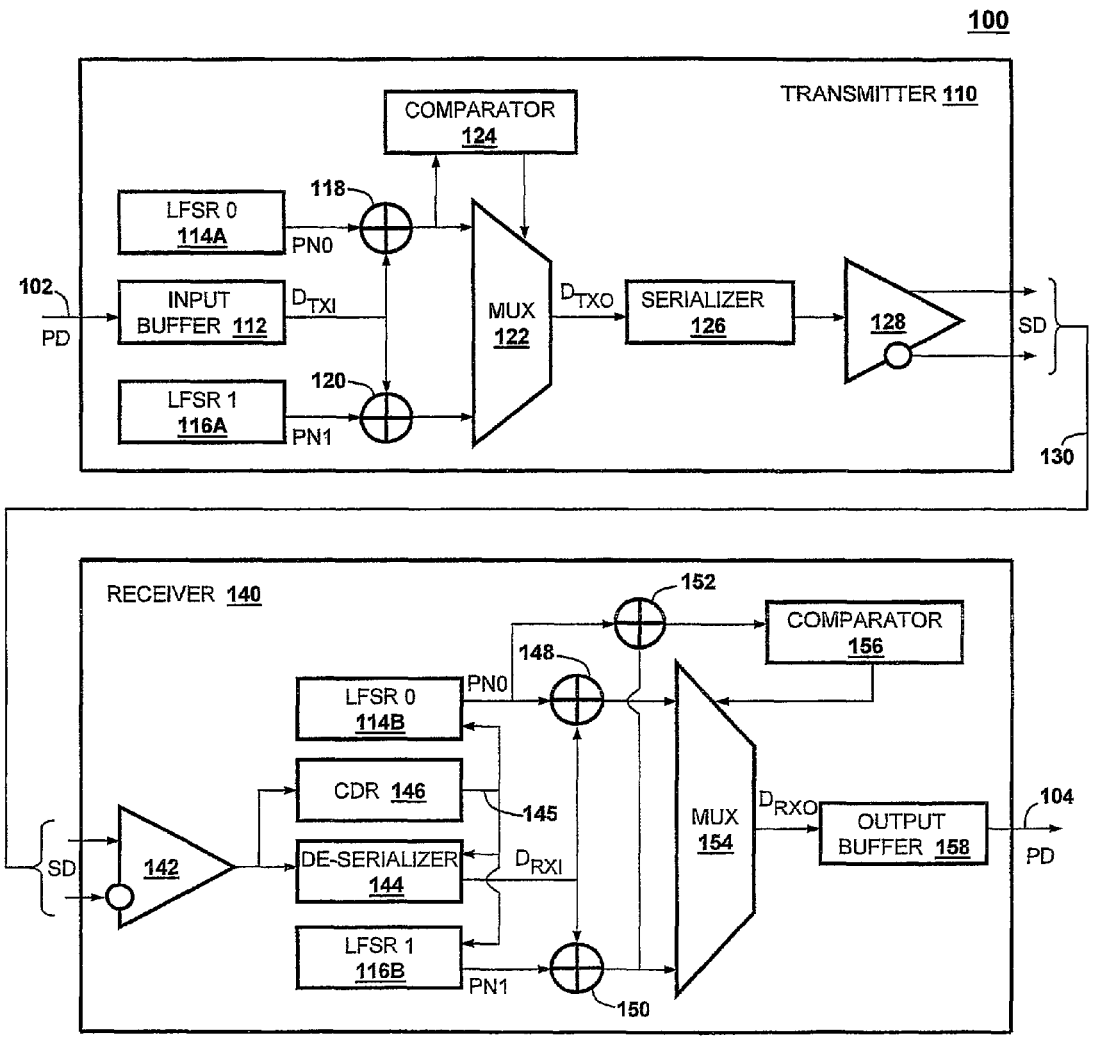
FIG. 1 is a high level block diagram of a high-speed serial interconnection system configured for implementing one or more embodiments of the invention.

The images in the drawings are simplified for illustrative purposes and are not depicted to scale. To facilitate understanding, identical reference numerals are used, where possible, to designate substantially identical elements that are common to the figures, except that suffixes may be added, when appropriate, to differentiate such elements.

It has been contemplated that features or steps of one embodiment may be incorporated in other embodiments of the invention without further recitation.

DETAILED DESCRIPTION OF AN ILLUSTRATIVE EMBODIMENT

The present invention provides a method, system, and computer program product for transmitting parallel data via a high-speed serial interconnection utilized in, for example, a computer, a workstation, a server, or other advanced digital system or apparatus.

With reference now to the figures, and in particular with reference to FIG. 1, there is illustrated a high level block diagram of an illustrative embodiment of high-speed serial interconnection system 100 in accordance with the present invention. In particular, interconnection system 100 includes transmitter 110, receiver 140, and serial interface 130 connecting transmitter 110 to receiver 140. Particular components of the system 100 may be implemented as hardware devices, software modules, firmware, or any combination thereof.

In one embodiment, transmitter 110 generally includes input buffer 112 for parallel data PD provided via parallel interface 102, linear feedback shift registers (LFSRs) 114A and 116A, logic XOR modules 118 and 120, multiplexer 122, comparator 124, serializer 126, and output driver 128.

In operation, LFSRs 114A and 116A receive as inputs different initial vectors IV0 and IV1 and thereafter generate as outputs pseudo-random numbers PN0 (LFSR 114A) and PN1 (LFSR 116A), each pseudo-random number having a bit length equal to a bit length of data words in the parallel data PD. In one embodiment, LFSRs 114A, 116A are maximal LFSRs, and the pseudo-random numbers PN0, PN1 are maximum length sequence (MLS) polynomial rings, which are commonly referred to as M-sequences.

Logic XOR modules 118 and 120 selectively scramble data words of the parallel data PD and the pseudo-random numbers PN0 and PN1 output by LFSRs 114A and 116A, respectively. Then, comparator 124 analyzes an output of logic XOR module 118 and makes a determination whether an output of logic XOR module 118 or an output of logic XOR module 120 should be forwarded by multiplexer 122 to serializer 126 and serialized (i.e., converted in a serial data format) therein.

In particular, if the number PN0 or the 1's complement thereof is equal to a data word being transmitted, comparator 124 causes multiplexer 122 to forward to serializer 126 the output of logic XOR module 120 (i.e., logic XOR of the data word and the pseudo-random number PN1). Otherwise, comparator 124 causes multiplexer 122 to forward to serializer 126 the output of logic XOR module 118 (i.e., XOR of the data word and the pseudo-random number PN0). These operations may be described using the following equations:

$$D_{TX0} = D_{TXI} \oplus PN1, \text{ if } D_{TXI} \oplus PN0 \text{ are all 0 or all 1}, \quad \text{(Eq. 1)}$$

and $$D_{TX0} = D_{TXI} \oplus PN0, \text{ if } D_{TXI} \oplus PN0 \text{ are not all 0 or all 1}, \quad \text{(Eq. 2)}$$

wherein $D_{TXI}$ is the being transmitted data word and $D_{TX0}$ is an output scrambled data word of multiplexer 122. Then, using output driver 128 and serial interface 130, an output of serializer 126 is transmitted to receiver 140 as serial data SD. Illustratively, serial interface 130 is a symmetrical wired interface having conductors coupled to non-inverting and inverting output terminals of output driver 128.

In one embodiment, receiver 140 generally includes input stage 142, de-serializer 144, LFSRs 114B and 116B, clock/data recovery (CDR) circuit 146, logic XOR modules 148, 150, and 152, multiplexer 154, comparator 156, and output buffer 158.

Input stage 142 is connected to serial interface 130 and operates as a recipient of serial data SD. Output signal of CDR circuit 146 is used to recover a clock signal in the serial data SD, de-serialize the serial data SD (i.e., convert it into a parallel data format), and synchronize, via interface 145, LFSRs 114B, 116B with LFSRs 114A, 116A and with the serial data SD.

Logic XOR modules 148 and 150 scramble de-serialized data words of the serial data SD and the pseudo-random numbers PN0 and PN1 output by LFSRs 114B and 116B, respectively, and logic XOR module 152 scrambles the pseudo-random number PN0 and an output of logic XOR module 150. Comparator 156 analyzes an output of logic XOR module 152 and makes a determination whether an output of logic XOR module 148 or an output of logic XOR module 150 represents the transmitted data word of parallel data PD and should be forwarded to output buffer 158, which is accessible via parallel interface 104.

In particular, if the logic XOR of (i) the pseudo-random number PN0 and (ii) the logic XOR of a de-serialized data word and the pseudo-random number PN1 are equal to the number output PN0 or the 1's complement thereof, comparator 156 causes multiplexer 154 to forward to output buffer 158 the output of logic XOR module 150 (i.e., the logic XOR of the de-serialized data word and the pseudo-random number PN1). Otherwise, comparator 156 causes multiplexer 154 to forward to output buffer 158 the output of logic XOR module 148 (i.e., logic XOR of the de-serialized data word and the pseudo-random number PN0). These operations allow to identify which of the pseudo-random numbers PN0, PN1 should be used to de-scramble a particular de-serialized data word of the serial data SD and may be described using the following equations:

$$D_{RX0}=D_{RXI}\oplus PN1, \text{ if } D_{RXI}\oplus PN1\oplus PN0 \text{ are all 0 or all 1,} \quad (Eq. 3)$$

and $$D_{RX0}=D_{RXI}\oplus PN0, \text{ if } D_{RXI}\oplus PN1\oplus PN0 \text{ are not all 0 or all 1,} \quad (Eq. 4)$$

wherein $D_{RXI}$ is the de-serialized data word and $D_{RX0}$ is an output of multiplexer 154.

Figure 2:
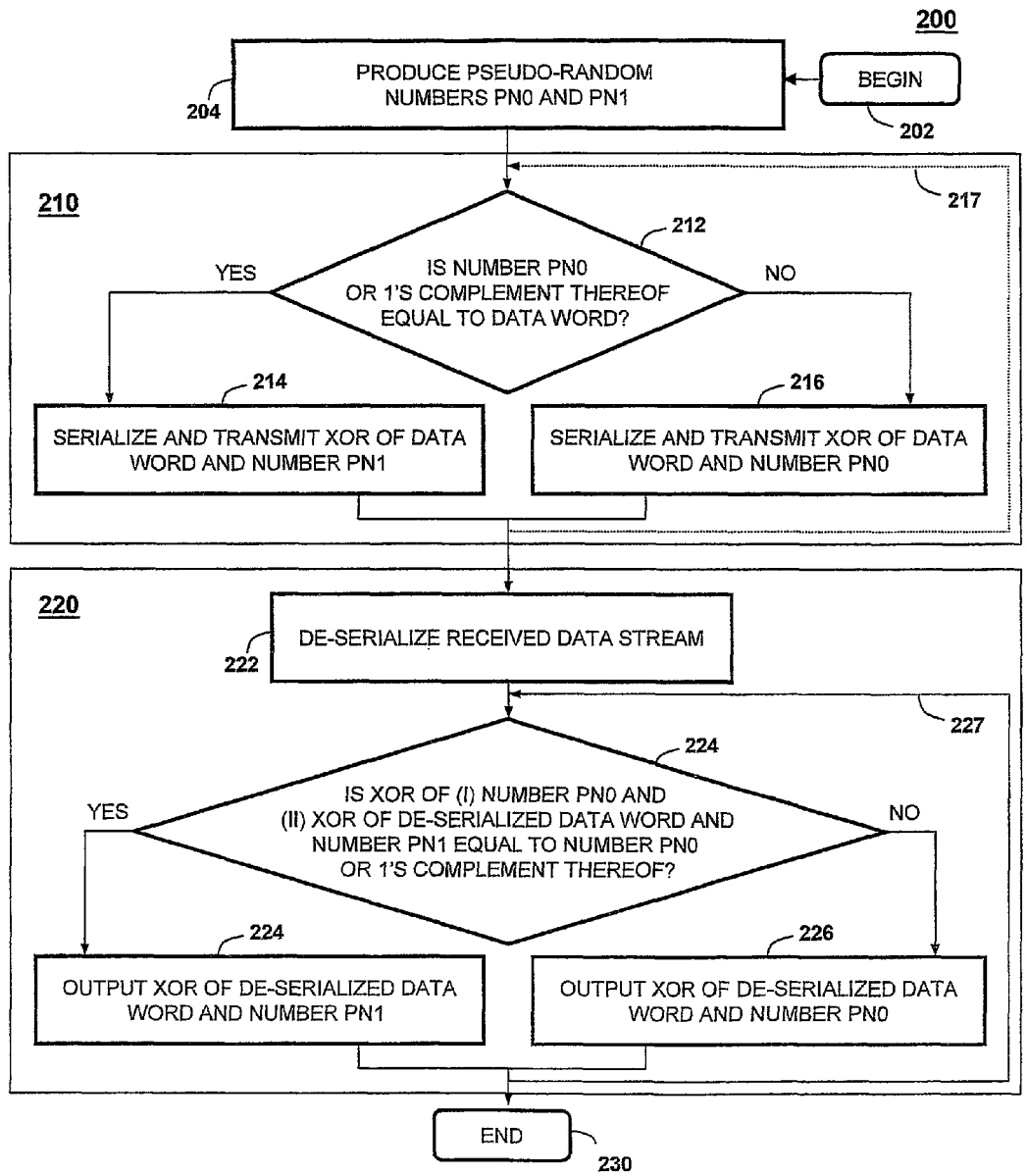
FIG. 2 is a high level flowchart of a process by which the features of the invention are implemented, according to one embodiment of the invention.

With reference now to FIG. 2, there is illustrated a high level logical flowchart of process 200 for transmitting parallel data using interconnection system 100 in accordance with one embodiment of the present invention. To best understand the invention, the reader should refer to both FIGS. 1 and 2.

As shown, process 200 begins at block 202 and thereafter proceeds to block 204. At block 204, LFSRs 114A, 114B and 116A, 116B are initiated with different initial vectors IV0 and IV1 and, in synchronization, start generating pseudo-random numbers PN0 and PN1, respectively. Synchronization between LFSRs 114A, 116A and 114B, 116B may be achieved by using, e.g., a pilot digital stream that is sent to receiver 140 prior to transmission of the serial data SD.

Then, at transmitter 110, process 200 performs sequence 210 that begins at block 212, where comparator 124 queries whether pseudo-random number PN0 output by LFSRs 114A or the 1's complement thereof is equal to a data word of the parallel data PD. If the query is answered positively, at block 214 transmitter 110 serializes and transmits to receiver 140 the logic XOR of the data word and pseudo-random number PN1, as described above by Eq. 1. If, however, the query is answered negatively, at block 216 transmitter 110 serializes and transmits to receiver 140 the logic XOR of the data word and pseudo-random number PN0, as described above by Eq. 2. Sequence 210 then returns to block 212 (shown with link 217) and continues until all data words of the parallel data PD are similarly processed and transmitted, as serial data SD, to receiver 140.

At receiver 140, process 200 performs sequence 220 that begins at block 222, in which the serial data SD received from transmitter 110 is de-serialized into individual de-serialized (i.e., parallel) data words. At block 224, comparator 156 queries whether the logic XOR of (i) the pseudo-random number PN0 and (ii) the logic XOR of a de-serialized data word and the output number PN1 are equal to the output number PN0 or the 1's complement thereof. If the query is answered positively, at block 224 receiver 140 outputs the logic XOR of the de-serialized data word and the pseudo-random number PN1, as described above by Eq. 3. If, however, the query is answered negatively, at block 226 receiver 140 outputs the logic XOR of the de-serialized data word and the pseudo-random number PN0, as described above by Eq. 4. Sequence 220 then returns to block 224 (shown with link 227) and continues until all de-serialized data words of the serial data SD are similarly processed.

Upon completion of sequences 210 and 220, process 200 ends at block 230.

While the invention has been particularly shown as described with reference to a preferred embodiment, it will be understood by those skilled in the art that various changes in form and detail may be made therein without departing from the spirit and scope of the invention. For example, it will be appreciated that the concepts disclosed herein may be extended or modified to apply to other types of configuration entities than those disclosed herein. In addition, those skilled in the understand upon reference to the foregoing that any of a wide variety of rules may be applied to determine which configuration entities are presented, meaning that the particular syntax and presentation rules described herein are merely exemplary and not exhaustive.

Furthermore, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette, flash memory, or hard disk drive). It should be understood, therefore, that such signal-bearing media, when carrying or encoding computer readable instructions that direct the functions of the present invention, represent alternative embodiments of the present invention.

What is claimed is:

1. A method of transmitting parallel data via high-speed serial interconnection between a transmitter and a receiver, the method comprising:
   generating at each of the transmitter and receiver pseudo-random first and second numbers, each number having a bit length equal to a bit length of data words in the data;
   at the transmitter:
      if the first number or a 1's complement thereof is equal to a data word, serializing and transmitting a logic XOR of the data word and the second number; otherwise, serializing and transmitting a logic XOR of the data word and the first number;

at the receiver:

de-serializing received data; and if a logic XOR of (i) the first output and (ii) a logic XOR of a de-serialized data word and the second number are equal to the first number or a 1's complement thereof, outputting a logic XOR of the de-serialized data word and the second number; otherwise, outputting a logic XOR of the de-serialized data word and the first number.

2. The method of claim 1, and further comprising:
synchronizing the first and second numbers generated at the receiver with the first and second numbers generated at the transmitter.

3. The method of claim 1, and further comprising:
selectively generating the first number and the second number using initial vectors having different numerical values.

4. The method of claim 1, and further comprising:
generating the first and second numbers using linear feedback shift registers.

5. The method of claim 1, wherein the first and second numbers are maximum length sequence (MLS) polynomial rings.

6. A high-speed serial interconnection system, comprising:
a transmitter including:
  an input buffer for buffering data;
  a first linear feedback shift register (LFSR) for providing a pseudo-random first number;
  a second LFSR for providing a pseudo-random second number;
  a first module for performing logic XOR of a data word in the input buffer and the first number;
  a second module for performing logic XOR of a data word retrieved from the input buffer and the second number;
  a first comparator coupled to an output of the second module;
  a first multiplexer of outputs of the first and second modules, the first multiplexer controlled by the first comparator;
  a data serializer of an output of the first multiplexer; and
  an output driver coupled to an output of the data serializer;
a receiver including:
  an input stage;
  a third LFSR for providing the first number;
  a fourth LFSR for providing the second number;
  a de-serializer of data received from the input stage;
  a circuit configured to recover a clock signal from the data;
  a third module for performing logic XOR of a de-serialized data word and the first number;
  a fourth module for performing logic XOR of a de-serialized data word and the second number;
  a fifth module for performing a logic XOR of (i) the first number and (ii) a logic XOR of a de-serialized data word and the second number;
  a second comparator coupled to an output of the fifth module;
  a second multiplexer of outputs of the third and fourth modules, the second multiplexer controlled by the second comparator; and
  an output buffer coupled to an output of the second multiplexer; and
a serial interface connecting the output driver of the transmitter to the input module of the receiver.

7. The system of claim 6, wherein the first and second LFSRs are synchronized with the input buffer.

8. The system of claim 6, wherein the first and second numbers are maximum length sequence (MLS) polynomial rings.

9. The system of claim 6, wherein each of the first and second numbers has a bit length equal to a bit length of data words in the data.

10. The system of claim 6, wherein the first comparator is configured to determine whether or not an output of the first module is equal to the data word.

11. The system of claim 6, wherein the clock signal synchronizes the third and fourth LFSRs with the first and second LFSRs and with the data.

12. The system of claim 6, wherein the second comparator is configured to determine whether or not an output of the fifth module is equal to the first number output or a 1's complement thereof.

13. A computer program product for transmitting parallel data via high-speed serial interconnection between a transmitter and a receiver, said computer program product comprising:
a data storage medium; and
computer program code within the data storage medium, said computer program code including instructions for:
  generating at each of the transmitter and receiver pseudo-random first and second numbers, each number having a bit length equal to a bit length of data words in the data;
  at the transmitter:
    if the first number or a 1's complement thereof is equal to a data word, serializing and transmitting a logic XOR of the data word and the second number; otherwise, serializing and transmitting a logic XOR of the data word and the first number;
  at the receiver:
    de-serializing received data; and
    if a logic XOR of (i) the first output and (ii) a logic XOR of a de-serialized data word and the second number are equal to the first number or a 1's complement thereof, outputting a logic XOR of the de-serialized data word and the second number; otherwise, outputting a logic XOR of the de-serialized data word and the first number.

14. The computer storage product of claim 13, wherein said computer program code further includes instructions for: synchronizing the first and second numbers generated at the receiver with the first and second numbers generated at the transmitter.

15. The computer storage product of claim 13, wherein said computer program code further includes instructions for: selectively generating the first number and the second number using initial vectors having different numerical values.

16. The computer storage product of claim 13, wherein said computer program code further includes instructions for: generating the first and second numbers using linear feedback shift registers.

17. The computer storage product of claim 13, wherein the first and second numbers are maximum length sequence (MLS) polynomial rings.

* * * * *